Aug. 5, 1969  J. A. TURGEON  3,459,876
SUPPORT STRUCTURE INCLUDING CRISS-CROSS TIE RODS FOR
ISOLATED PHASE BUS BAR SYSTEM
Filed March 7, 1968
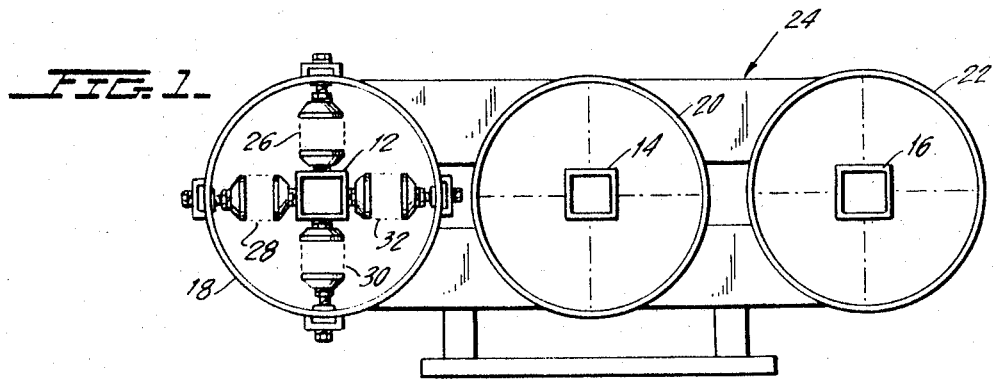
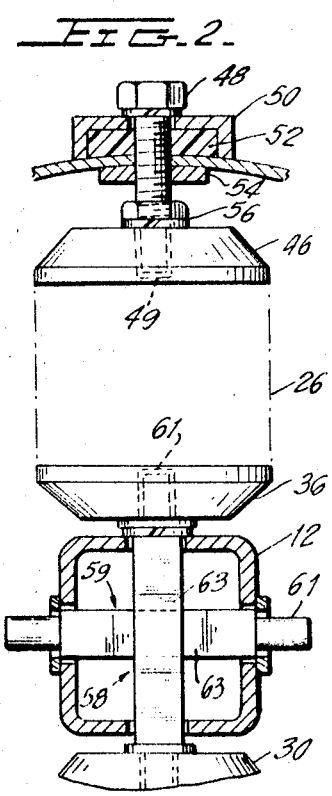
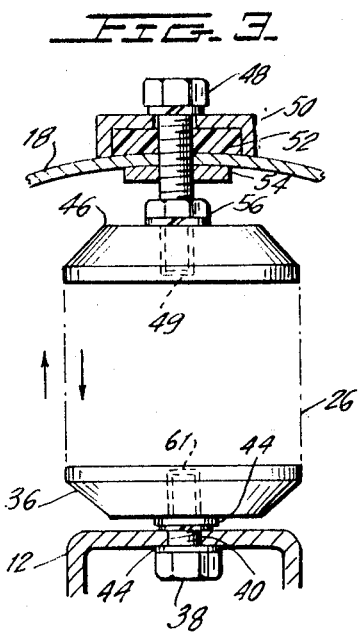
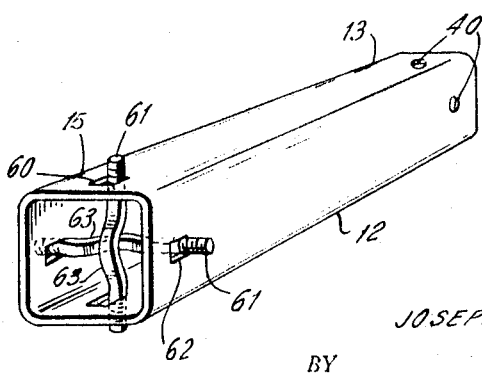
INVENTOR.
JOSEPH A. TURGEON
BY
OSTROLENK, FABER, GERB & SOFFEN
ATTORNEYS

United States Patent Office 3,459,876
Patented Aug. 5, 1969

3,459,876
SUPPORT STRUCTURE INCLUDING CRISS-CROSS
TIE RODS FOR ISOLATED PHASE BUS BAR
SYSTEM
Joseph A. Turgeon, Toronto, Ontario, Canada, assignor to I-T-E Circuit Breaker (Canada) Limited, Port Credit, Ontario, Canada, a limited-liability company of Canada
Filed Mar. 7, 1968, Ser. No. 711,247
Int. Cl. H02g 5/00; H01b 17/18
U.S. Cl. 174—99
13 Claims

ABSTRACT OF THE DISCLOSURE

Support structure for carrying a bus bar within an associated housing. The support structure includes a bolt and nut arrangement which is initially secured to the housing whereupon the insulator associated therewith can be subsequently threaded onto the bolt without subjecting either the insulator or housing to compression or tension forces, respectively. In addition a novel criss-cross tie rod construction is utilized to connect pairs of oppositely disposed insulators to the bus bar and to one another.

---

This invention relates to structure for supporting a current carrying conductor within an associated housing, and in particular is directed to structure which is capable of supporting a current carrying conductor on insulators within an associated housing without exerting compressive and corresponding reaction forces on the insulators and housing, respectively.

In power distribution systems, it is common to support a plurality of current carrying conductors, each within an associated housing. Generally each conductor carries a single phase of a multi-phase system and is shielded from exterior effects and effects of the other conductors by a housing placed about the conductor. Such a system is generally known as an isolated phase bus system, and it is to such system that the intant invention is directed. However, it is to be understood that the instant invention will find application in any environment in which it is desirable to support a conductor within a housing.

Prior art techniques for supporting conductors within a housing have given rise to problems, the solutions to which are both complex and costly. Specifically, prior art supporting structures generally locate a plurality of insulators between the conductor and its housing, but because of the relatively weak nature of the thin sheet metal which generally constitutes such housings, and because of radial forces exerted between the insulators and the housing, it is necessary to provide the housings with reinforcing rings at the points where the insulators are secured thereto.

Illustrative prior art may be seen in United States Patent 2,874,207 issued to W. H. Schymik, Feb. 17, 1959. With reference to FIGURE 3 of the Schymik patent it may be seen that a reinforcing ring 11 has been provided around the exterior of the housing 13 at the points at which insulators 15 are secured thereto. The need for such reinforcing rings becomes apparent when one considers that in rigidly securing insulator 15 in place, adjusting stud 18 is rotated so that its forward portion causes compression on the insulator 15 and corresponding reaction or tension forces on the walls of the housing 13. The reinforcing rings 11 prevent reaction or tension forces from either deforming the walls of the housing or stretching the housing walls beyond their elastic limit to cause failure thereof.

In contrast to the above-noted prior art, the instant invention contemplates support structure which will adequately support a current carrying conductor while at the same time eliminate the forces which are normally exerted on the insulators and the associated housing. Thus the instant invention manifestly simplifies the overall construction of bus bar systems and eliminates the cost of providing additional supports such as the ring 11 of the Schymik patent.

To accomplish the desired result, the instant invention contemplates locating a plurality of insulators between a conductor and its housing. One end of each insulator carries the conductor and the opposite end of each insulator is secured to the housing by novel connecting structure, to be further described in the specification, which allow the insulators to be permanently secured in place without subjecting the insulators or the housing to compression and radial distortion (tension) forces, respectively, which normally accompany prior art support systems.

In a preferred embodiment of the instant invention, pairs of oppositely disposed insulators are joined together by tie means which pass through the bus bar and into screw-threaded engagement with the first end of each of the oppositely disposed insulators. Such tie means preferably take the form of an elongated tie rod which passes through a pair of enlarged elongated slots in the bus bar whereby the bus bar is free to expand or contract with changing temperature. Washers are provided to prevent lateral displacement of the bus bar with respect to the housing.

In still another preferred embodiment, a pair of such tie rods is utilized to interconnect two pairs of oppositely disposed insulators. As a particularly advantageous feature, the pair of tie rods is economically manufactured of identical construction, each including an offset central portion which displacedly criss-cross within the bus bar to permit the two pairs of insulators associated therewith to be mounted in the same plane.

Accordingly, it is an object of the instant invention to provide an isolated phase bus bar system including a housing, a bus bar, a plurality of insulators supporting the bus bar within the housing, and means for connecting the insulators to the housing without subjecting the insulators and the housing to compression and tension forces, respectively.

It is another object of the instant invention to provide structure for an enclosed bus bar system including a conductor and a housing, such structure being capable of supporting the conductor without the necessity of a supporting ring being provided on the exterior of the housing.

It is another object of the instant invention to provide support structure for isolated phase bus bar systems which includes tie means for interconnecting pairs of oppositely disposed insulators to one another and to the bus bar.

Yet another object of the instant invention is to provide such a system wherein the aforementioned tie means comprises an elongated tie rod which passes through slots provided in the bus bar to permit thermal expansion.

Yet another object of the instant invention is to provide such an arrangement which includes two criss-cross tie rods of identical construction each including a central offset portion which permits all insulators at that particular support location to be situated in a common plane.

Other objects and a fuller understanding of the instant invention may be had by referring to the following description and claims, taken in conjunction with the accompanying drawings, in which:

FIGURE 1 shows an isolated phase bus bar system which incorporates the novel support structure of the instant invention;

FIGURE 2 shows a partial cross-sectional view of a preferred embodiment of the support structure of the instant invention;

FIGURE 3 shows a partial cross-sectional view of an alternative embodiment of the instant invention; and FIGURE 4 is a perspective view of a section of bus bar and suggests the manner that such section is to be supported within an associated housing.

Referring to FIGURE 1, there is shown an isolated bus bar system which includes a plurality of conductors 12, 14 and 16 supported within respective cylindrical housings 18, 20 and 22. The housings are supported by a suitable frame indicated generally by 24. Each of the conductors 12, 14 and 16 preferably carries a single phase of a multi-phase power distribution system, but it is to be understood that similar structure is capable of carrying similar phased currents or more or less varied phases than the three shown in FIGURE 1.

The conductor 12 is centrally supported within its housing 18 by support arrangements which include a plurality of insulators 26, 28, 30 and 32, one end of each of the insulators supporting the conductor 12, in a manner to be further described, while the opposite end of the insulators is secured to the housing 18, in a manner to be more fully described. It is to be understood that conductors 14 and 16 are supported within their respective housings 20 and 22 by an arrangement similar to that shown with respect to conductor 12.

FIGURE 3 shows in detail the manner in which the conductor 12 is supported within the housing 18. It is to be understood that in a preferred embodiment of the instant invention the support arrangement, to be immediately described, is utilized at one end 13 of a bus bar such as 12 (see FIGURE 4). This end 13 wherein the support arrangements of FIGURE 3 are utilized, represents a fixed securement of the bus bar 12 relative to the housing 18. As will be further explained, the support arrangement of FIGURE 2 is utilized at the opposite end 15 of the bus bar 12 to permit longitudinal expansion and contraction of the bus bar 12 relative to the housing 18. Referring in detail now to FIGURE 3, it will be seen that insulator 26 is secured at a first end 36 to the conductor 12 by a bolt 38 which passes through an aperture 40 in the conductor 12 and into screw-threaded engagement with the insulator end 36. Suitable spacers 44 are located between the end 36 and the conductor, and between the head of the bolt and the conductor.

The opposite end 46 of the insulator 26 is secured to the housing 18 by means of a bolt 48 which passes through a gasket retainer 50, a gasket 52, the housing 18, threaded spacer 54, lock nut 56 and into screw-threaded engagement with the end of the insulator. It is noted that the bolt 48 is in screw-threaded engagement with spacer 54 and the lock nut 56, all of which are necessarily internally threaded with a pitch which corresponds to the pitch of the bolt 48.

To appreciate the novel force reducing effects achieved by the structure of FIGURE 3, the steps of assembly will now be described. On assembly, insulator 26 (and insulators 28, 30 and 32) is bolted to the conductor 12 by the bolt 38. The conductor with the insulators bolted thereon is then inserted into the housing and positioned so that the conductor is in the center of the housing. Next the gasket retainer 50, with gasket 52 therein, and spacer 54 are held in place while the bolt 48 is passed through the gasket retainer 50, gasket 52 and screwed through spacer 54. The lock nut 56 is then put on, and the bolt 48 is then screwed into the insulator end 46.

At this point it is noted that there are no compression or tension forces between the insulator 26 and housing 18, respectively (which forces were necessary to hold the assembly together in the prior art described previously), since the bolt 48 has passed through three commonly threaded elements with no possible forces resulting between the insulator 26 and housing 18. The only force present is an insignificant compressive force one the housing wall 18 between the gasket retainer 50 (with gasket 52 therein) and the threaded spacer 54. As can be seen in FIGURE 2, the end of bolt 48 never reaches the bottom of the bolt-receiving aperture 49, and thus the bolt itself never exerts compressive forces on insulator 26. As the bolt is rotated, it tightens gasket retainer 50 against the housing due to the interaction between gasket retainer 50 and threaded spacer 54. At this point in assembly the insulator 26 is merely "floating," so to speak, on the bolt 48 and has had no compressive forces applied to it by the bolt 48.

Finally, when the head of bolt 48 is flush with retainer 50 and can be rotated no farther, the lock nut 56 is tightened slightly so as to prevent relative turning between the insulator 26 and bolt 48 in service due to vibration. It can be seen that the conductor 12 is now securely positioned within the housing 18, and such positioning has been accomplished without subjecting the insulators 26, 28, 30 and 32 and housing 18 to compression and tension forces, respectively, which normally accompany the assembly of similar prior art support structures. Thus the need for additional support structure such as the reinforcing rings shown in the prior art have been completely eliminated.

Referring to FIGURE 2, wherein like numerals are used for like elements, there is shown the support arrangement used at the end 15 of the bus bars. In this arrangement, opposite pairs of insulators 26, 30 and 28, 32 are joined to one another by tie rods 58 and 59, respectively, which terminate in threaded ends 61.

The rods 58 and 59 pass through elongated slots 60 and 62 on opposite sides of the conductor 12 so that the conductor 12 is free to move longitudinally with respect to the housing 18 due to thermal expansion and contraction. The tie rods are preferably of identical construction and include central offset portions 63 which are turned away from one another. This unique arrangement materially simplifies assembly since all insulators can lie in the same plane.

The manner in which the opposite end 46 of the insulators is secured to the housing is similar to that described in FIGURE 3 and consequently will not be repeated. It is to be noted, however, that the support structure of FIGURE 2 functions to maintain the conductor 12 within the housing 18 in a manner which eliminates compression and tension forces on the insulators and housing, respectively, and thus eliminates the need for a reinforcement ring at the points at which the insulators are secured to the housing.

The embodiments of the invention in which an exclusive privilege or property is claimed are defined as follows:

1. An isolated phase bus bar system comprising:
   a housing;
   a bus bar; and
   a support arrangement for supporting said bus bar within said housing; said support arrangement including:
      a plurality of insulators;
      tie means passing through said bus bar and connected to first ends of said insulators for securing oppositely disposed insulators to one another; and
      a plurality of connecting means respectively secured to a second end of said insulators and said housing for connecting each of said insulators to said housing without subjecting said insulators and said housing to compression and tension forces, respectively.

2. The isolated phase bus bar system of claim 1 wherein said tie means passes through elongated slots in said bus bar to permit relative longitudinal movement therebetween.

3. The isolated phase bus bar system of claim 2 wherein said support arrangement further includes washer means disposed about said slots and between said busbar and said insulators for preventing lateral displacement of said bus bar with respect to said housing.

4. The isolated phase bus bar system of claim 2 wherein said support arrangement is positioned at a first location in said housing; and further including a second support arrangement positioned at a second location within said housing for supporting said bus bar within said housing, said second support arrangement including:
- a second plurality of insulators, each connected at a first end to said bus bar; and
- a second plurality of connecting means respectively secured to a second end of said second plurality of insulators and said housing for connecting each of said insulators to said housing without subjecting said insulators and said housing to compression and tension forces, respectively;
- whereby said bus bar can longitudinally expand in a predetermined direction from said second support arrangement toward said first support arrangement in response to rising temperatures.

5. The isolated phase bus bar system of claim 4 wherein said tie means includes a pair of criss-crossed tie rods for interconnecting two pairs of oppositely disposed insulators.

6. The isolated phase bus bar system of claim 5 wherein said pair of tie rods are of identical construction and each includes central offset regions which are directed away from one another such that insulators connected to said pair of tie rods may all lie in the same plane.

7. The isolated phase bas bar system of claim 1 wherein said tie means includes a pair of criss-crossed tie rods for interconnecting two pairs of oppositely disposed insulators.

8. The isolated phase bus bar system of claim 7 wherein said pair of tie rods are of identical construction and each includes central offset regions which are directed away from one another such that insulators connected to said pair of tie rods may all lie in the same plane.

9. The isolated phase bus bar system of claim 8 wherein each of said connecting means of said first and second support arrangements includes:
- first means for securing its respective insulator to said housing;
- second means positioned concentrically with respect to said first means within said housing for securing said first means to said housing without exerting compressive forces on its respective insulator and tension forces on said housing; and
- third means positioned concentrically with respect to said first means and adjacent its respective insulator for firmly positioning said first means with respect to its insulator.

10. The isolated phase bus bar system of claim 9 wherein said first means comprises bolt means passing through said housing and into screw-threaded engagement with said respective insulator.

11. The isolated phase bus bar system of claim 10 wherein said respective insulator has a bolt-receiving aperture therein, said bolt means remaining at a predetermined distance from the bottom of said aperture.

12. The isolated phase bus bar system of claim 10 wherein said second means comprises spacer means in a screw-threaded engagement with said bolt means, said spacer means being tightened against the interior of said housing withuot exerting forces on said respective insulator.

13. The isolated phase bus bar system of claim 12 wherein said third means comprises nut means in screw-threaded engagement with said bolt means, said nut means being positioned against said respective insulator without exerting compressive forces on said respective insulator or tension forces on said housing.

References Cited

UNITED STATES PATENTS

| | | |
|---|---|---|
| 2,570,885 | 10/1951 | Swerdlow et al. |
| 2,763,710 | 9/1956 | West et al. |
| 2,775,643 | 12/1956 | Scott. |
| 2,874,207 | 2/1959 | Schymik. |

LARAMIE E. ASKIN, Primary Examiner

U.S. Cl. X.R.

174—149